United States Patent [19]

Arcella et al.

[11] Patent Number: 5,045,143

[45] Date of Patent: Sep. 3, 1991

[54] METHOD OF PRODUCING ADHESIVELY BONDED METAL FLUROELASTOMER COMPOSITES

[75] Inventors: Vincenzo Arcella, Novara; Raffaele Ferro; Giulio Tommasi, both of Milan, all of Italy

[73] Assignee: Ausimont S.p.A., Milan, Italy

[21] Appl. No.: 423,559

[22] Filed: Oct. 16, 1989

Related U.S. Application Data

[63] Continuation of Ser. No. 282,969, Dec. 6, 1988, abandoned, which is a continuation of Ser. No. 173,039, Mar. 28, 1988, abandoned, which is a continuation of Ser. No. 886,930, Jul. 18, 1986, abandoned.

[30] Foreign Application Priority Data

Jul. 24, 1985 [IT] Italy ................................ 21701 A/85

[51] Int. Cl.$^5$ ................................................ C09J 5/02
[52] U.S. Cl. .............................. 156/307.3; 156/153; 156/326; 428/421; 525/326.4; 526/206; 526/249; 526/255
[58] Field of Search ................... 156/307.3, 153, 326; 525/326.4; 526/255

[56] References Cited

U.S. PATENT DOCUMENTS

| | | | |
|---|---|---|---|
| 3,876,654 | 4/1975 | Pattison | 524/315 X |
| 3,940,527 | 2/1976 | Brandon | 156/153 |
| 4,000,356 | 12/1976 | Weisgerber et al. | 526/206 |
| 4,259,463 | 3/1981 | Moggi et al. | 428/421 X |
| 4,501,869 | 2/1985 | Talemoto et al. | 526/249 |

*Primary Examiner*—John J. Gallagher
*Attorney, Agent, or Firm*—Morgan & Finnegan

[57] ABSTRACT

Metal-fluoroelastomer composites constituted by a metal part and by a cured fluoroelastomer part bonded to each other with high adhesion strength, wherein the fluoroelastomeric part is constituted by a copolymer containing from 35 to 80 mol % T of vinylidene fluoride, from 15 to 35 mol % of hexafluoropropene, from 0 to 30 mol % of another comonomer selected from fluoro-olefins and/or perfluorovinyl ethers, and from 0.001 to 2 wt. % of bromine.

8 Claims, No Drawings

METHOD OF PRODUCING ADHESIVELY BONDED METAL FLUROELASTOMER COMPOSITES

This application is a continuation of application Ser. No. 282,969 filed Dec. 6, 1988, (now abandoned) which in turn is a continuation of application Ser. No. 173,039 filed Mar. 28, 1988, now abandoned, which in turn is a continuation of application Ser. No. 886,930, filed July 18, 1986, now abandoned.

The present invention relates to metal-fluoroelastomer composites.

More particularly, the present invention relates to metal-fluoroelastomer composites constituted by a metal part and by a cured fluoroelastomeric part bonded to each other with high adhesion strength.

Fluoropolymers and, in particular, fluoroelastomers based on vinylidene fluoride, cured, e.g., by processes of the ionic, aminic or peroxidic type, are known products which are used in several industrial fields thanks to their properties of high thermal stability and of chemical resistance even at high temperatures.

Due to these characteristics, they are used in particular applications, above all in contact with organic and inorganic fluids characterized by high chemical aggressivity and under severe temperature conditions, for continuous use.

For exemplifying purposes, one of the most important applications of fluoroelastomers is the manufacture of gaskets for both static and dynamic uses.

From this viewpoint, a particularly important field is that of seals on rotary shafts, accomplished by shaft seals.

In this case, it is absolutely essential that between the fluoroelastomer, which constitutes the sealing element, and the metal insert a perfect adhesion be achieved; one that is able to remain completely unaltered even at high temperatures (100°-250° C.).

In the presently known processes for the curing of fluoroelastomer, extensively in the past and presently to a lesser extent, derivatives of diamines, such as carbamates, have been used.

However, these accelerator-curing agents, even if they allow satisfactory adhesion values to be obtained, suffer from the drawback of rendering not very reliable the processing of the elastomer, due to the occurrence of scorching phenomena.

By using the other curing systems on the basis of crosslinking agents, such as, e.g., of the type of bisphenols, and of accelerator agents on the basis of quaternary phosphonium or aminophosphonium salts wherein the anion is mostly chloride, bromide or tetrafluoroborate, the scorching phenomena are avoided, but the adhesion strength turns out to be poor.

As a consequence, articles constituted by metal parts onto which the fluoroelastomer has been applied, such as the above-mentioned shaft seals, have a short life and must be replaced frequently, and with undesirable down-time of the machinery on which they are installed.

It has, surprisingly, now been found, and this is the object of the present invention, that metal-fluoroelastomer composites constituted by a metal part and by a part consisting of a cured fluoroelastomer bonded to each other with high adhesive strength can be obtained, if the fluoroelastomeric part is constituted by a copolymer of vinylidene fluoride, with hexafluoropropene and possibly other comonomers selected from fluoroolefins and/or perfluorovinyl ethers, containing from 0.001 to 2 wt % of bromine bonded to carbon atoms in the polymer chain. According to a preferred embodiment, the bromine content is within the range of from 0.01 to 1 wt %.

The fluoroelastomers used according to the present invention are obtained according to per se known techniques, as described, e.g., in Kirk-Othmer, *Encyclopedia of Chemical Technology*, Vol. 8, pages 504-following (1979). Bromine is introduced into the copolymer by using, as chain-transfer agent in the copolymerization reaction, products of the general formula:

$$C_p X_q Br_m$$

wherein
X can be either fluorine or chlorine;
p is an integer between 1 and 4;
m is an integer between 1 and $2p+2$; and
q has the value of $2p+2-m$.

The chain-transfer agent is added to the reacting monomers in amounts within the range of from 0.01 to 0.3 mol %. The preferred transfer agent is $CF_2Br_2$.

The use of these products in the copolymerization of vinylidene fluoride with hexafluoropropene and possibly other fluoro-olefins and/or perfluorovinyl ethers, besides allowing regulation of the molecular weight, as all chain-transfer agents do, allows one to obtain high strength of adhesion of fluoropolymer to metal.

Fluoroelastomers used according to the present invention contain from 35 to 80 mol % of vinylidene fluoride, from 15 to 35 mol % of hexafluoropropene, and from 0 to 30 mol % of other comonomers selected from fluoro-olefins and/or perfluorovinyl ethers.

Fluoro-olefins may be selected from among tetrafluoroethylene, chlorotrifluoroethylene, vinyl fluoride, etc.; perfluorovinyl ethers may be selected from among perfluoromethylvinyl ether, perfluoroethylvinyl ether, perfluoropropylvinyl ether, etc.

Particularly preferred are the copolymers containing from 75 to 80 mol % of vinylidene fluoride and from 20 to 25 mol % of hexafluoropropene, or terpolymers containing from 35 to 80 mol % of vinylidene fluoride, from 15 to 35 mol % of hexafluoropropene, and up to 30 mol % of tetrafluoroethylene. The fluoroelastomers used according to the present invention may be cured by using per se known curing agents, such as the dihydroxy compounds described in U.S. Pat. No. 3,876,654, or peroxy compounds, such as the organic peroxides and the peroxidic crosslinking adjuvants as described in *Rubber Chemistry and Technology*, Vol. 51, page 940 (1978).

As accelerators in the curing process by means of dihydroxy compounds, one may use the quaternary ammonium or phosphonium or aminophosphonium compounds, as respectively disclosed in U. K. Patent No. 1,356,344, in U.S. Pat. No. 3,876,654, and in U. K. Patent No. 2,010,285.

The operating conditions for the preparation of the compounds and the curing thereof are substantially within those as usually adopted for fluoroelastomers, as described in Kirk-Othmer, loc. cit.

Any metals, or metal alloys, may be used to produce the composites of the present invention; in particular, iron, copper, zinc, aluminum, etc. and their alloys, such as, e.g., steels, special steels, cast irons, bronzes, brasses, etc.

For the preparation of the composites of the present invention it is enough to treat the metal part by degreasing agents and sandblasting, and then apply an adhesive to bond the two parts to each other.

For the purpose of evaluating the adhesion strength between the cured elastomeric composition and the metal, the ASTM D-816 Standard were employed. Sandwich-shaped specimens were prepared, having a layer of fluoroelastomer between two plates of carbon steel UNI Fe-37 A, of dimensions of 80×25×2 mm. These plates were degreased in Algofrene$^{(R)}$ 113 (1,1,2-trichlorotrifluoroethane) vapor bath and sandblasted on their bonding areas with corundum (granulometry 0.01 mm), and then degreased again. On the portions of their surfaces intended for the bonding, the adhesive was applied by spraying.

As the adhesive, Chemosil 511 (a functionalized silane, i.e., a silane having having a functional group), Henkel's trade name, was used.

Adhesion between the plates treated with the adhesive and the elastomer is achieved during the press-curing step. The overlapping surface is an area of about 625 mm$^2$ (rubber thickness = 3.8 mm).

Molding conditions: $P = 6-7$ MPa
$T = 170 \pm 2°$ C.

For the better understanding of the present invention and of practically embodying it, an illustrative non-limitative working example follows:

EXAMPLE

Two fluoroelastomers, of which the one, elastomer (A), has the composition: 79 mol % of vinylidene fluoride, 21 mol % of perfluoropropene; and the other, elastomer (B), has the composition: 79 mol % of vinylidene fluoride, 21 mol % of perfluoropropene, and a content of 0.15 wt % of bromine, both of them having Mooney viscosity ML (1+4) at 100° C. = 60, were compounded in a cylinder-mixer with the same curing formulation, consisting of:

| Rubber | parts by weight | 100 |
| Bisphenol AF | parts by weight | 1.6 |
| Accelerator | parts by weight | 0.45 |
| MgO | parts by weight | 3 |
| Ca(OH)$_2$ | parts by weight | 6 |
| MT Black | parts by weight | 30 |

As the accelerator agent, an amino-phosphonium salt of formula:

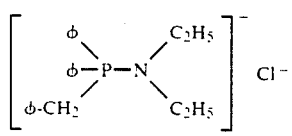

i.e., diphenyl-benzyl-diethylamine-phosphonium chloride, was used.

For each rubber, a series of tests was carried out, after press-curing under 6 MPa and at 175° C. for 10 minutes, to show their mechanical characteristics.

The results are shown in the following Table.

TABLE

|  | (A) | (B) |
|---|---|---|
| Modulus at 100% (MPa) | 5.7 | 5.8 |
| Tensile Strength (MPa) | 15 | 15.1 |
| Elongation at Break (%) | 185 | 194 |
| Hardness (Shore A) | 73 | 73 |

A sample of each uncured rubber, 3.8 mm in thickness and having a surface of 625 mm$^2$, was interposed between two plates of carbon steel UNI Fe-37 A, having dimensions of 80×25×2 mm, degreased in Algofrene$^{(R)}$ 113 (1,1,2-trichlorotrifluoroethane) vapor bath, and sandblasted with corundum of 0.01 mm in granulometry.

On one of the two plates a thin layer of adhesive, constituted by Chemosil$^{(R)}$ 511. was applied.

The adhesion between the plate treated with the adhesive and the elastomer is achieved during the step of press-curing under 6 MPa and at 170° C.

After 10 minutes, at the end of the curing step, a test was carried out to verify the adhesion strength of the two samples; for fluoroelastomer (A), the peeling away of the metal plate occurred after applying to the sample a peeling stress shear stress of 2.9 MPa, while fluoroelastomer (B) tore, without peeling, when a stress of 8 MPa was reached.

What is claimed is:

1. In a process for obtaining a high adhesion between a metal surface and a fluoroelastomer by vulcanizing said fluoroelastomer on the metal surface coated with an adhesive, the improvement comprising using as the fluoroelastomer a copolymer containing from 35 to 80 mol % of vinylidene fluoride, from 15 to 35 mol % of hexafluoropropene, from 0 to 30 mol % of another comonomer selected from the class consisting of fluoro-olefins and perfluorovinyl ethers, and from 0.001 to 2 weight % of bromine, using as vulcanizing agent a dihydroxy compound and using as vulcanization accelerator a quaternary ammonium or phosphonium or amino-phosphonium compound.

2. A process according to claim 1 in which the vulcanization accelerator is an aminophosphonium compound.

3. The process according to claim 1, wherein a curing system based on bisphenol AF as dihydroxy compound and diphenyl-benzyl-diethylamino-phosphonium chloride as accelerator is used.

4. The process according to claim 1, wherein the fluoro-olefins are selected from the class consisting of tetrafluoroethylene, chlorotrifluoroethylene, and vinyl fluoride.

5. The process according to claim 1, characterized in that the perfluorovinyl ethers are selected from the class consisting of perfluoromethylvinyl ether, perfluoroethylvinyl ether, and perfluoropropylvinyl ether.

6. The process according to claim 1, characterized in that the fluoroelastomer comprises a terpolymer containing from 35 to 80 mol % of vinylidene fluoride, from 15 to 35 mol % of perfluoropropene, and up to 30 mol % of tetrafluoroethylene.

7. The process according to claim 1, characterized in that the fluoroelastomer comprises a copolymer containing from 75 to 80 mol % of vinylidene fluoride and from 20 to 25 mol % of perfluoropropene.

8. The process according to claim 1, or 10, or 11, or 12, or 13, or 14, characterized in that the bromine content is within the range of from 0.01 to 1 wt %.

* * * * *